US 6,533,044 B2

(12) United States Patent
Pierce et al.

(10) Patent No.: US 6,533,044 B2
(45) Date of Patent: Mar. 18, 2003

(54) LIFT CONTROL VALVE AND FEEDBACK SYSTEM (75) Inventors: Marty Pierce, North Royalton, OH (US); Matthew John Plas, Elyria, OH (US)

(73) Assignee: MTD Products Inc

( * ) Notice: Subject to any disclaimer, the term of this patent is extended or adjusted under 35 U.S.C. 154(b) by 44 days.

(21) Appl. No.: 09/847,910

(22) Filed: May 2, 2001

(65) Prior Publication Data

US 2002/0029689 A1 Mar. 14, 2002

Related U.S. Application Data (60) Provisional application No. 60/201,096, filed on May 2, 2000.

(51) Int. Cl.[7] .............................................. A01B 63/02
(52) U.S. Cl. ........................... 172/439; 172/812; 172/1
(58) Field of Search .................. 172/439, 440, 172/442, 1, 812, 813, 819, 677, 679; 91/528, 426, 508, 531; 60/484, 486; 137/102; 56/DIG. 14

(56) References Cited

U.S. PATENT DOCUMENTS

| 2,579,134 A | | 12/1951 | Worthington | |
| 2,644,429 A | | 7/1953 | Waterman et al. | |
| 3,216,448 A | | 11/1965 | Stacey | |
| 3,750,757 A | * | 8/1973 | Saetti | |
| 3,997,007 A | * | 12/1976 | Junck et al. | |
| 4,133,178 A | | 1/1979 | Brooks, Sr. | |
| 4,260,024 A | | 4/1981 | Benassi | 172/12 |
| 4,492,080 A | | 1/1985 | Yapp et al. | 60/388 |
| 4,727,791 A | | 3/1988 | Satoh | 91/47 |
| 4,773,216 A | | 9/1988 | Ohashi et al. | 60/422 |
| 4,802,537 A | * | 2/1989 | Ryerson | |
| 4,856,277 A | | 8/1989 | Ohashi et al. | 60/422 |
| 4,866,936 A | | 9/1989 | Ohashi et al. | 60/422 |
| 4,903,779 A | | 2/1990 | Takemura | 172/10 |
| 4,979,092 A | | 12/1990 | Bergene et al. | 364/148 |
| 5,421,416 A | | 6/1995 | Orbach et al. | 172/4 |
| 5,469,921 A | | 11/1995 | Orbach et al. | 172/4 |
| 5,479,845 A | | 1/1996 | Kawamura et al. | 91/514 |
| 5,549,166 A | | 8/1996 | Orbach et al. | 172/4 |
| 5,720,214 A | * | 2/1998 | Kawamura | |
| 5,794,442 A | * | 8/1998 | Lisniansky | |
| 5,810,095 A | | 9/1998 | Orbach et al. | 172/2 |
| 6,250,396 B1 | * | 6/2001 | Gengler | |
| 6,283,488 B1 | * | 9/2001 | Adamek et al. | |
| 6,352,124 B1 | * | 3/2002 | Sancho | |

FOREIGN PATENT DOCUMENTS

GB          1 046 074 A         10/1966

OTHER PUBLICATIONS

Notification of Transmittal of the International Search Report or the Declaration dated Jan. 21, 2002.
International Search Report.

* cited by examiner

Primary Examiner—Victor Batson
(74) Attorney, Agent, or Firm—Brouse McDowell; Roger D. Emerson; Timothy D. Bennett (57) ABSTRACT A control valve and feedback system has three operating states including a lifting state, a neutral state, and a lowering state. The feedback control system comprises a cylinder, a pump, a reservoir for holding working fluid, and a control valve. The control valve comprises a valve body having first and second ends with a bore defined therebetween. The valve body further comprises an inlet port, a return port, a first work port and a second work port. The inlet port, return port, and first and second work ports are defined in the valve body. The inlet port communicates with the bore and the pump. The return port is in fluid communication with the bore and the reservoir. The first work port is also in communication with the bore and the cylinder in the lifting state. The control valve is plumbed backwards so that the first work port and the second work port are in fluid communication in the lowering state. The valve also comprises a check valve disposed in the first work port. The first check valve is adapted to achieve the neutral state and being selectively adjustable to achieve said lowering state.

13 Claims, 10 Drawing Sheets

LIFT CONTROL VALVE AND FEEDBACK SYSTEM

This invention claims priority from Provisional Patent Application, Ser. No. 60/201,096, which was filed on May 2, 2000. The provisional application is incorporated herein by reference.

BACKGROUND OF THE INVENTION

1. Field of Invention

This invention pertains to the art of methods and apparatuses for lawn and garden tractors and more specifically to methods and apparatuses for a lift control and feedback system.

2. Description of the Related Art

It is known for a lawn and garden tractor to have a position feed back control system for use in controlling the position (lifting and lowering) a three point hitch mounted to the back of the tractor. Typically, the position control includes a mechanical linkage that opens and closes a pair of hydraulic valves and allows a lift cylinder to move up and down. Generally, at least for the larger units, at least two important functions are needed. The first requirement is sensitivity, and the second requirement is the ability to lift a large amount of weight (generally 1000 to 1500 pounds or more). The sensitivity is required because the hitch must be capable of gently lowering with nothing on it, i.e. with no load. In the art, these two functional requirements are met by using two separate hydraulic valves—a first valve used to provide the lifting of loads and a second valve used to proved more "fine-tuned" operation such as to provide gently lowering under no load. Therefore, there is a need in the art to develop a feed back control system to accomplish the same two functions with a single control valve.

Typically pulling a lever, which in turn pushes a spool inward to a first position, operates at least one of the pair of control valves. At this position, oil is forced out of a work port to the backside of a lift cylinder. This results in raising the hitch. To lower the hitch, the spool is pushed in the opposite direction, which allows the oil to flow back through the work port and then through an exit line.

The present invention provides a new and improved lift control valve and feedback system, which is simple in design, effective in use, and overcomes the foregoing difficulties and others while providing better and more advantageous overall results.

SUMMARY OF THE INVENTION

A control valve and feedback system has three operating states including a lifting state, a neutral state, and a lowering state. The feedback control system comprises a cylinder, a pump, a reservoir for holding working fluid, and a control valve. The control valve comprises a valve body having first and second ends with a bore defined therebetween. The valve body further comprises an inlet port, a return port, a first work port and a second work port. The inlet port, return port, and first and second work ports are defined in the valve body. The inlet port communicates with the bore and the pump. The return port is in fluid communication with the bore and the reservoir. The first work port is also in communication with the bore and the cylinder in the lifting state. The control valve is plumbed backwards so that the first work port and the second work port are in fluid communication in the lowering state. The valve also comprises a check valve disposed in the first work port. The first check valve is adapted to achieve the neutral state and being selectively adjustable to achieve said lowering state. The valve also comprises one spool. The spool is received within the bore and has a first spool section and a cam spool section. The first spool section has a constant diameter, and the spool cam section has a variable diameter. The first spool section is adapted to be utilized with the first check valve to achieve the neutral state. The spool cam section is adapted to be utilized with the first check valve to achieve the lowering state. Accordingly, this invention provides a control valve and feedback system wherein the first check valve is adapted to prevent fluid from entering the associated cylinder during the neutral state.

It is yet another object of the present invention to provide a control valve and feedback system where the check valve is adapted to the selectively opened by a spool cam pin to selectively vary the discharge flow rate of the cylinder.

Further, another object of the present invention is to provide a control valve and feedback system wherein the spool cam pin is disposed in the valve body and contacts an outer surface of the spool cam section.

Another object of the present invention is to provide a lift control valve and feedback system where the check valve comprises a spring attached to the valve body, a ball connected to the spring, and a seat for the ball, where the spring is adapted to bias the ball against the seat and the spool cam pin extends through the seat and selectively contacts the ball as the spool cam pin moves around the spool cam section such that the ball overcomes the bias of the spring.

Still yet, another object of the present invention is to provide a control valve and feedback system that comprises a cylinder port. Where the cylinder is adapted to carry working fluid from the cylinder to the tank and such that the circuit formed between the tank and the cylinder is independent from the return port and the tank.

Further, another object of the present invention is provide a valve where the spool cam section is conical in shape.

It is yet another object of the present invention to provide a controlled valve and feedback system wherein the spool cam section has an angled cross-section that is substantially planar.

Still yet, another object of the present invention is to provide a control valve and feedback system wherein the spool cam section has a curved cross-section.

It is yet another object of the present invention to provide a method of obtaining a lifting state, a neutral, and a lowering state for a hitch of a tractor by using a control valve and feedback system which comprises the steps of positioning the spool to a first position, pressurizing fluid with the pump such that fluid flows from a tank through the inlet port and the first passageway to the cylinder, lifting the hitch, positioning the spool in the second position such that the spool provides fluid flow from the inlet port to the return port, maintaining the hitch in the lifting state, positioning the spool to a third position, draining fluid from the cylinder to the tank through the cylinder port, and lowering the switch.

Another object of the present invention is to provide a lift control valve and feedback system adapted to be used on a tractor that uses a hydraulic lift cylinder to raise and lower implements attached to a three point hitch on the rear of the tractor where a single three-position control valve is designed and piped as with your invention. In this way the hydraulic lift cylinder can accurately lift both relatively heavy and light objects.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
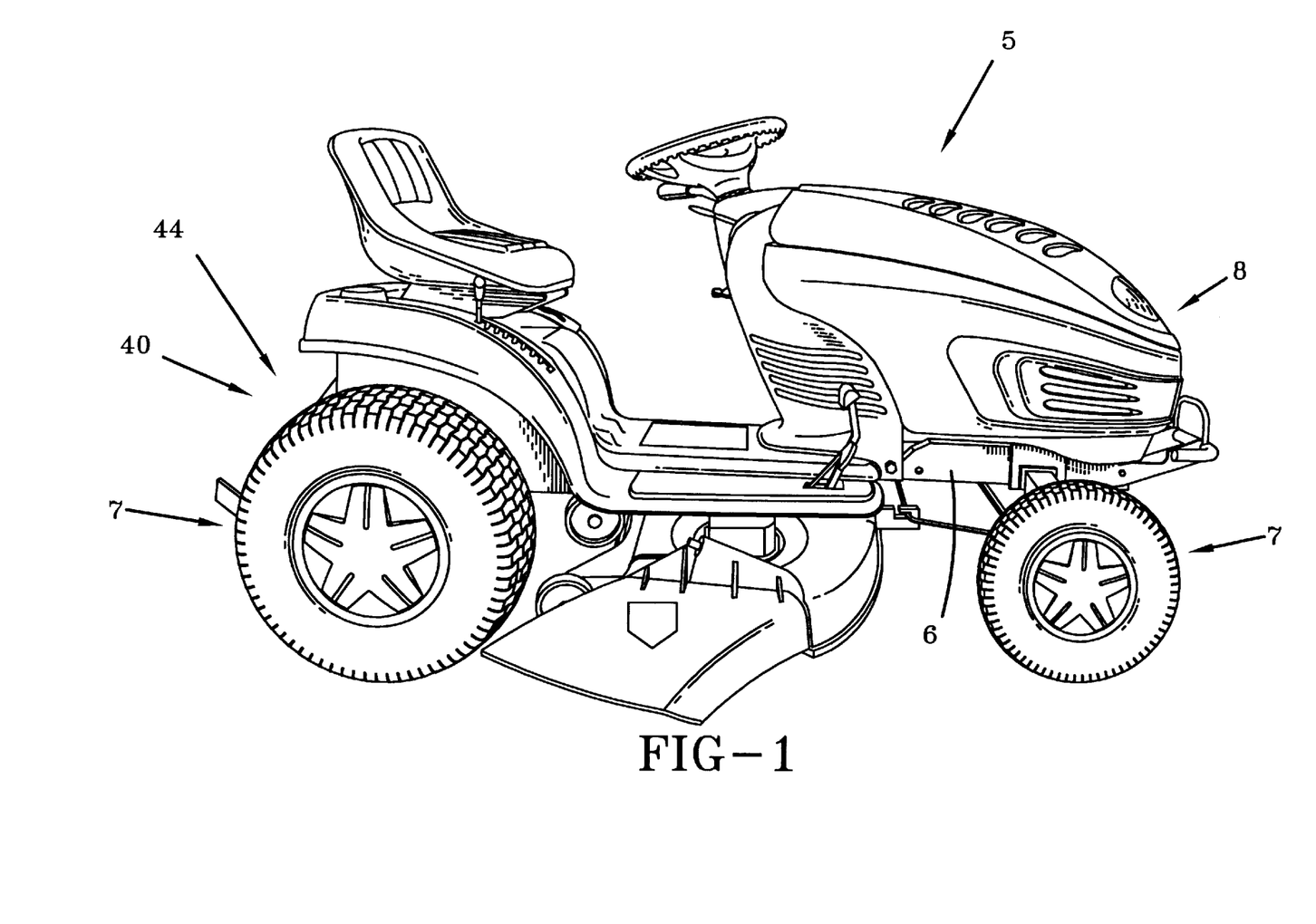
FIG. 1 is a perspective view of a tractor utilizing the present invention.
Figure 2:
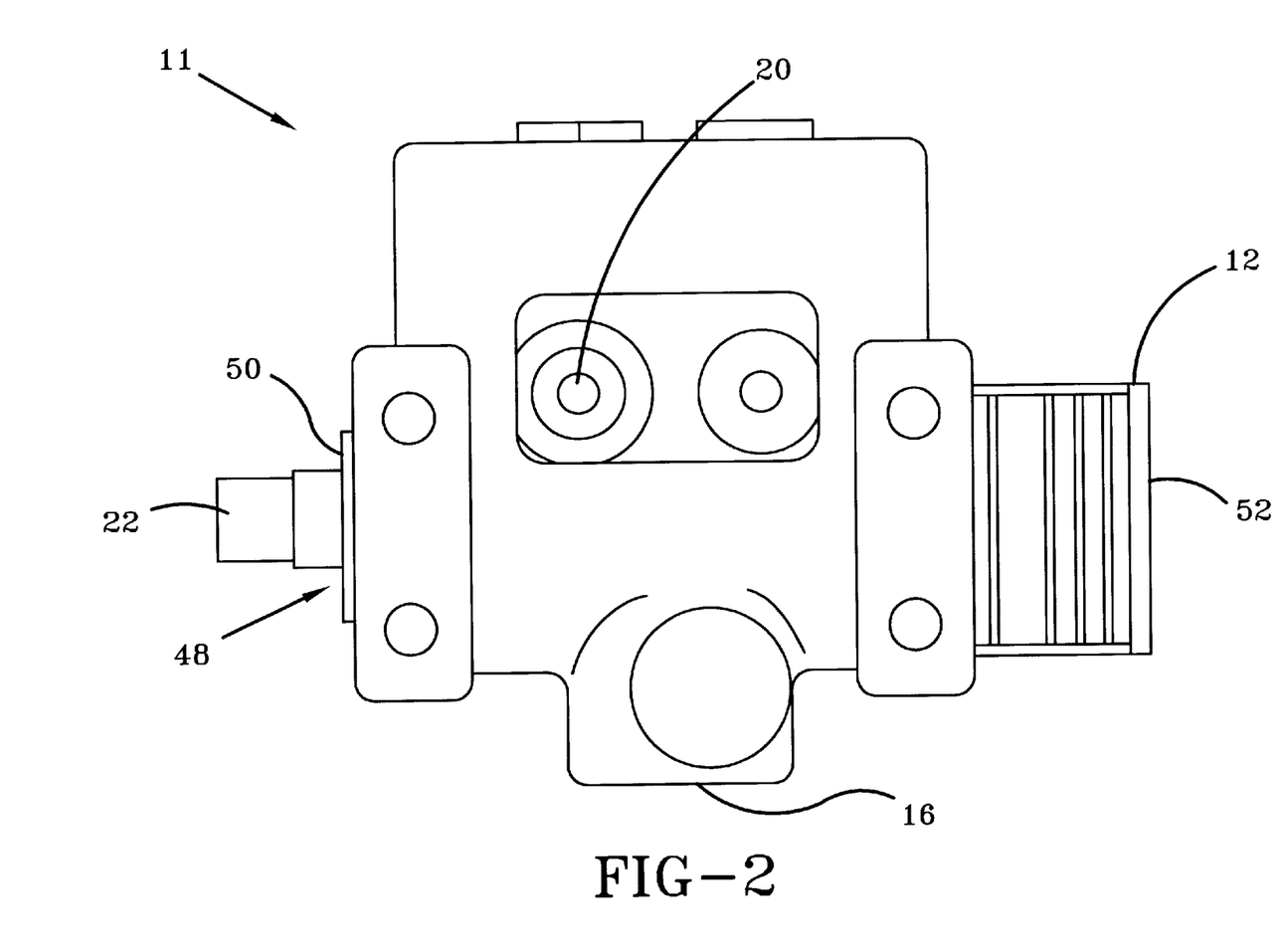
FIG. 2 is a perspective view of the valve used in the present invention showing the cylinder port side of the control valve.
Figure 3:
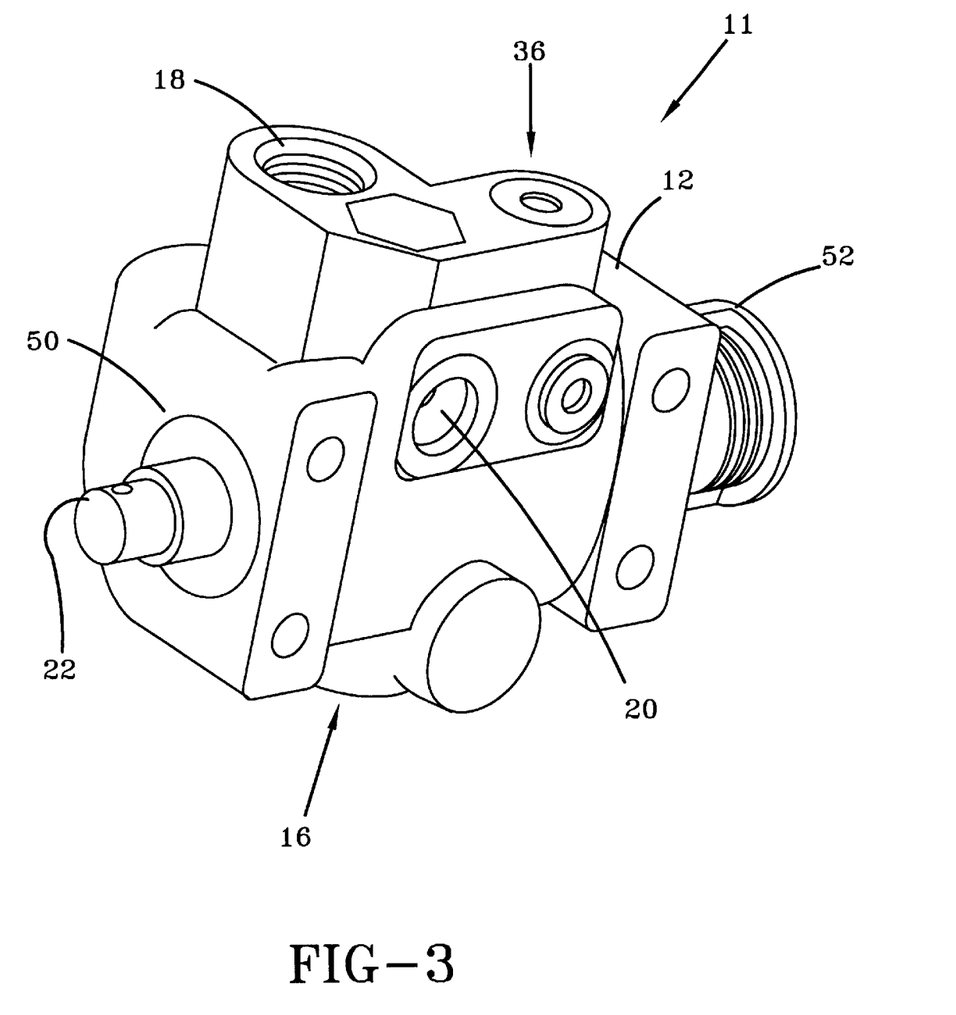
FIG. 3 is a perspective view of the valve of FIG. 2 showing the cylinder port side of the control valve.
Figure 4:
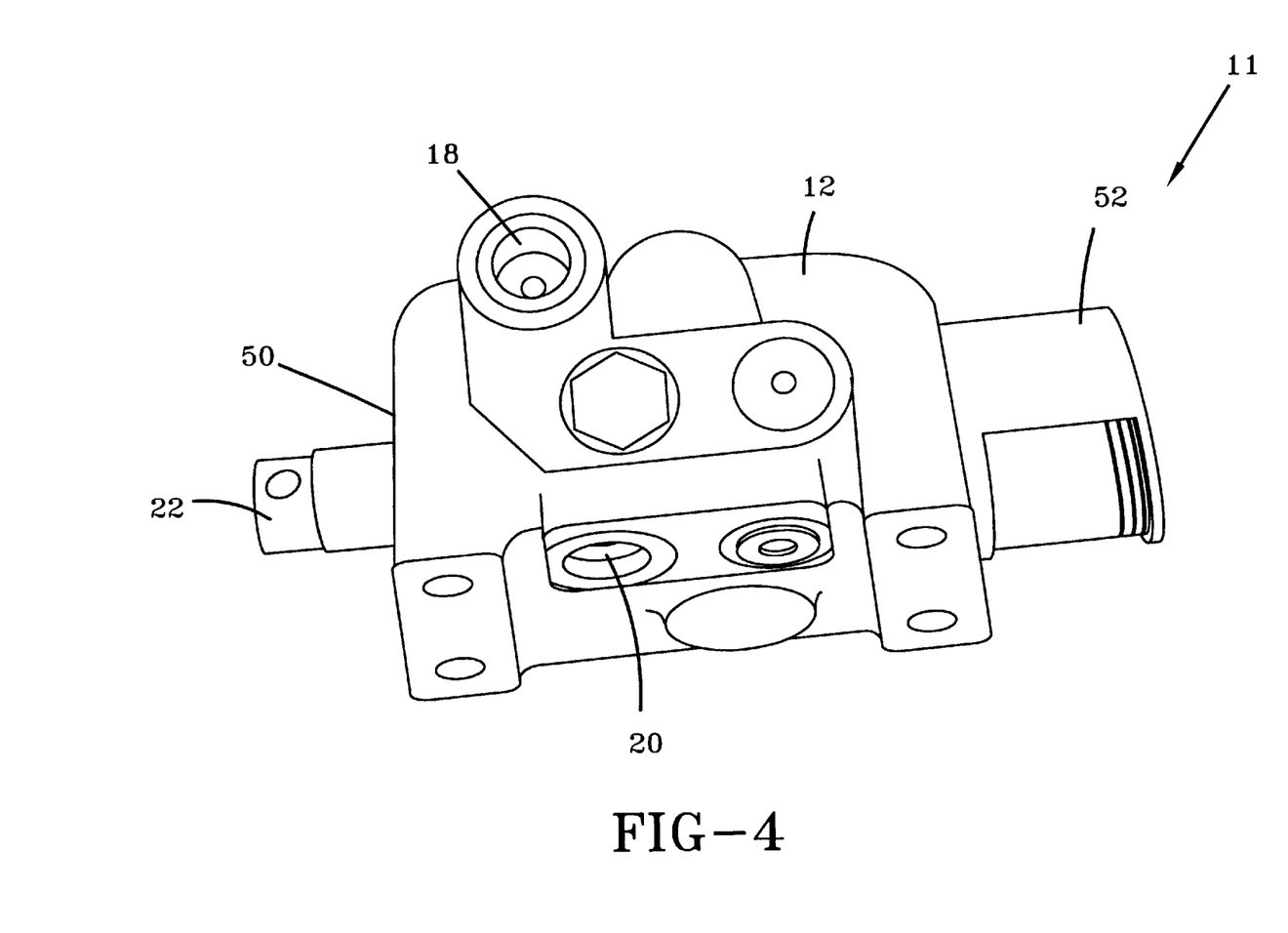
FIG. 4 is a perspective view of the valve of FIG. 2 showing the return port side of the control valve.

Referring now to the drawings wherein the showings are for purposes of illustrating a preferred embodiment of the invention only and not for purposes of limiting the same, FIGS. 1–12 illustrate the present invention. A tractor 5 comprises a frame 6, a plurality of wheels 7 and power means 8 attached to the frame 6, as shown in FIG. 1. Attached to the back of the tractor is a three-point hitch 44, which is utilized for lifting and lowering objects to various positions. It is contemplated to be within the scope of the present invention that any implement, which needs to be positioned accurately, may be attached to the three-point hitch, including without limitation, a mower deck. It is also contemplated to be within the scope of the present invention that the hitch may be of different types (not just a three-point hitch) and may be mounted at any position (including back, front and side) on the tractor 5.

Figure 5:
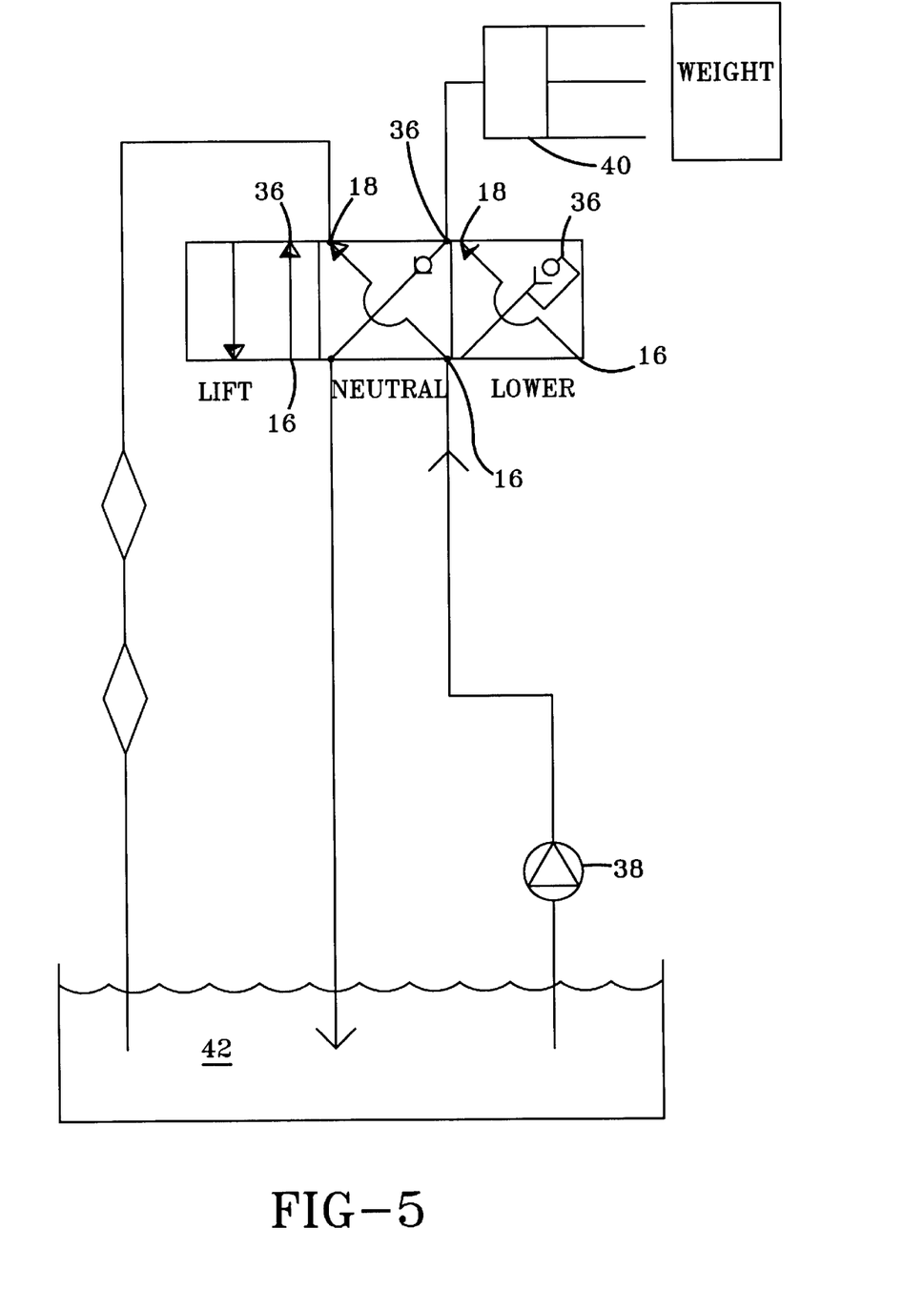
FIG. 5 is a schematic representation of the control valve and feedback system.
Figure 6:
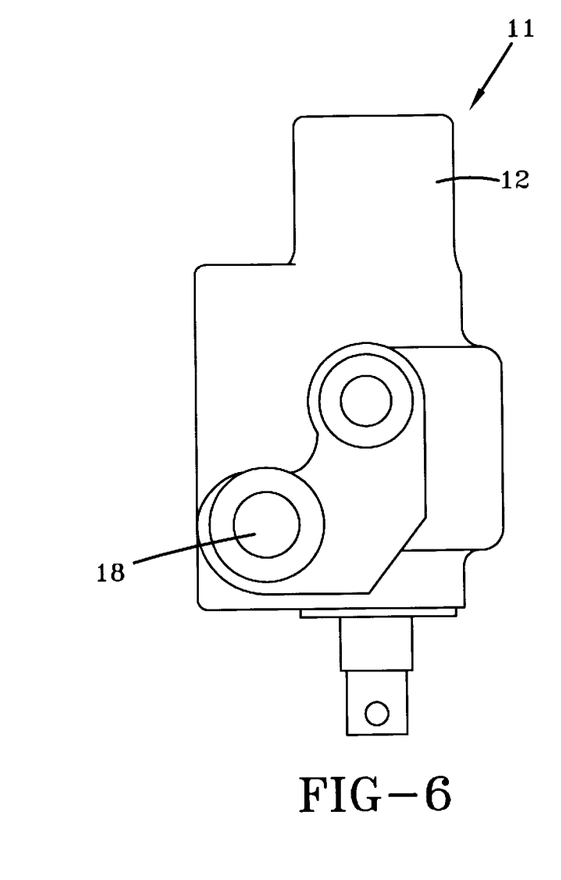
FIG. 6 is a top plan view of the return port side of the control valve.
Figure 7:
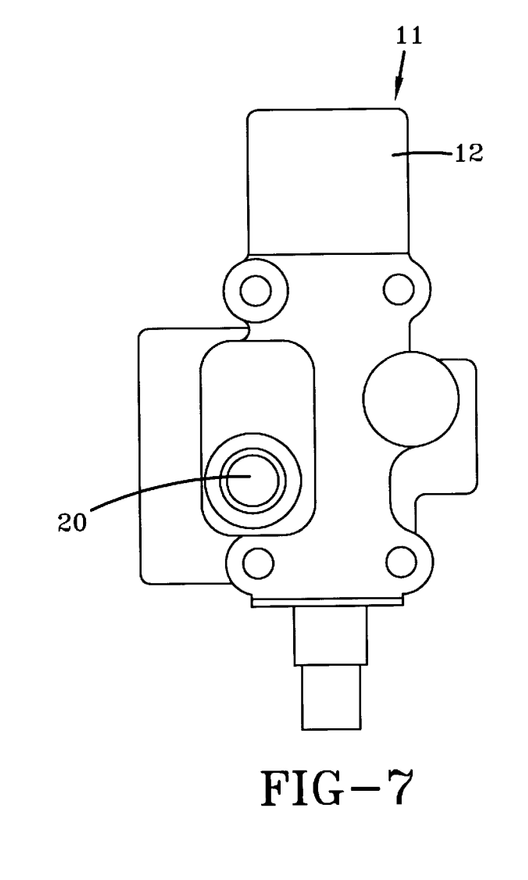
FIG. 7 is a top plan view of the cylinder port side of the control valve.
Figure 8:
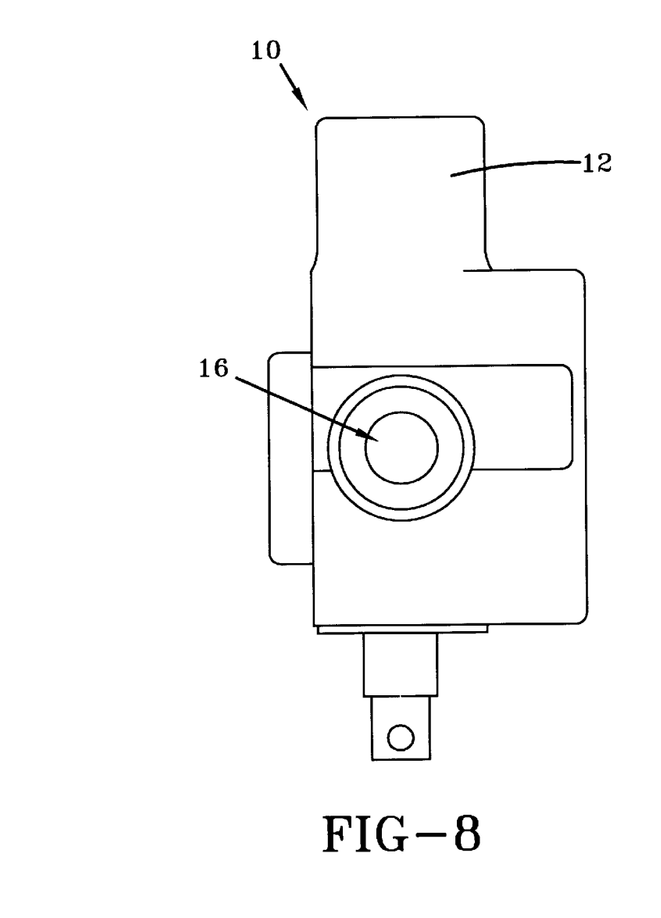
FIG. 8 is a top plan view of the inlet port side of the control valve.
Figure 9:
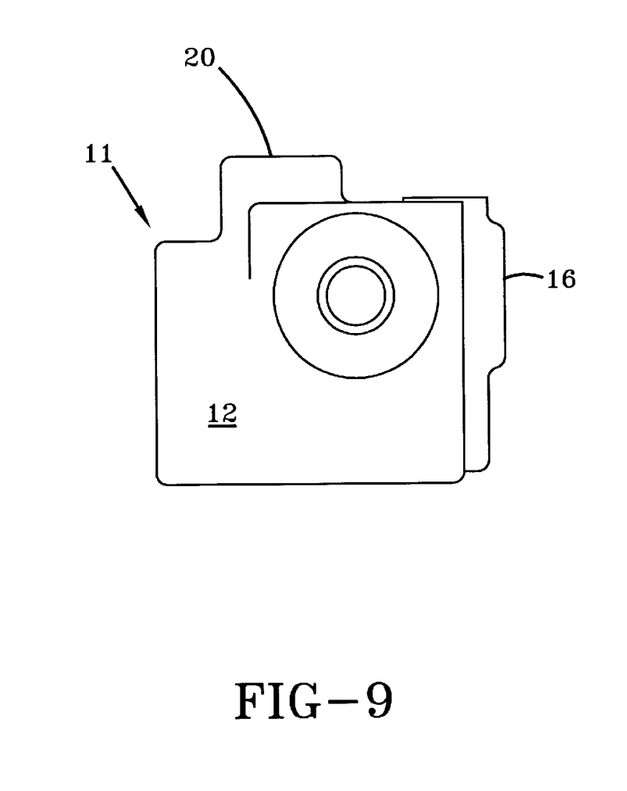
FIG. 9 is a side view of the bottom side of the control valve.
Figure 11:
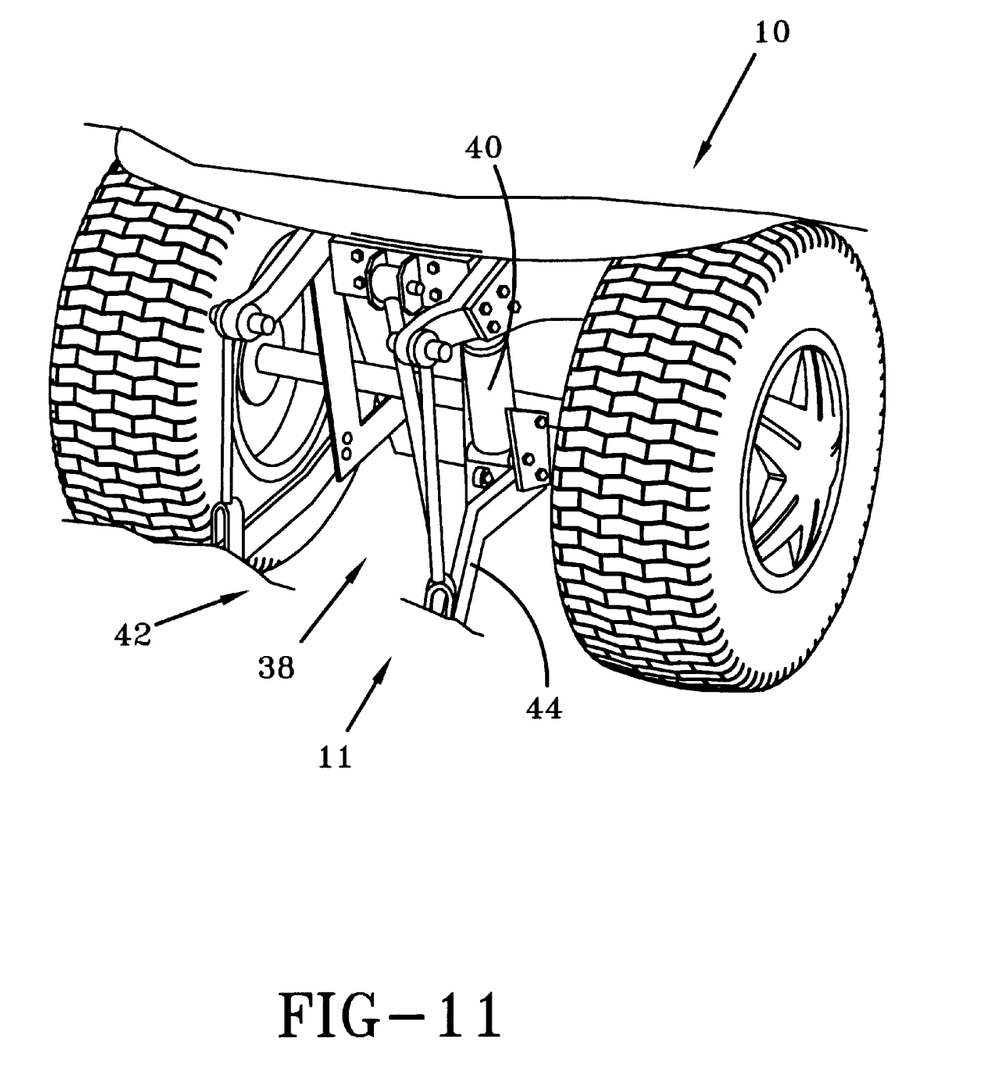
FIG. 11 is a perspective view of tractor of FIG. 1 showing the lift cylinder.

As shown in FIGS. 5 and 11, a feedback control system 10 has three operating states to control the position of the hitch 44. The operating states include a lifting state, a neutral state, and a lowering state. The feedback control system comprises a cylinder 40 that may be a single-acting cylinder, a pump 38, a tank (or reservoir) 42 for holding a working fluid, and a control valve 11. Until now, in order to raise and lower a hitch 44 with heavy weight, and yet maintain enough sensitivity when no weight is on the hitch, two separate control valves were required to achieve these two functions. By plumbing a hydraulic valve "backwards," one valve can now be used to obtain both functions that would otherwise require two separate control valves.

It has been found that when using a single control valve in a conventional manner, there may be enough backpressure in the system to automatically lift the hitch 44, even if the operator did not want the lifting action. Applicant has discovered that in order to bypass this backpressure the oil from the cylinder 40 may be drained to a secondary line so that the oil can drain directly to the tank 42. In other words, a work port is now being used as a secondary return line to alleviate the back-pressure of the system.

The cylinder 40 powers the hitch 44 upwards or permits it to lower. In essence, the cylinder 40 forces the hitch 44 and any implement attached thereto upwards, and the weight of the deck pushes or squeezes the oil out of the cylinder 40. In the preferred embodiment, a power mechanism is not required to lower the deck. Ideally, the deck simply "floats" down. Of course a power mechanism could be utilized during the lowering of the deck, but this not preferred since energy is conserved by allowing gravity to lower the implement.

Figure 10:
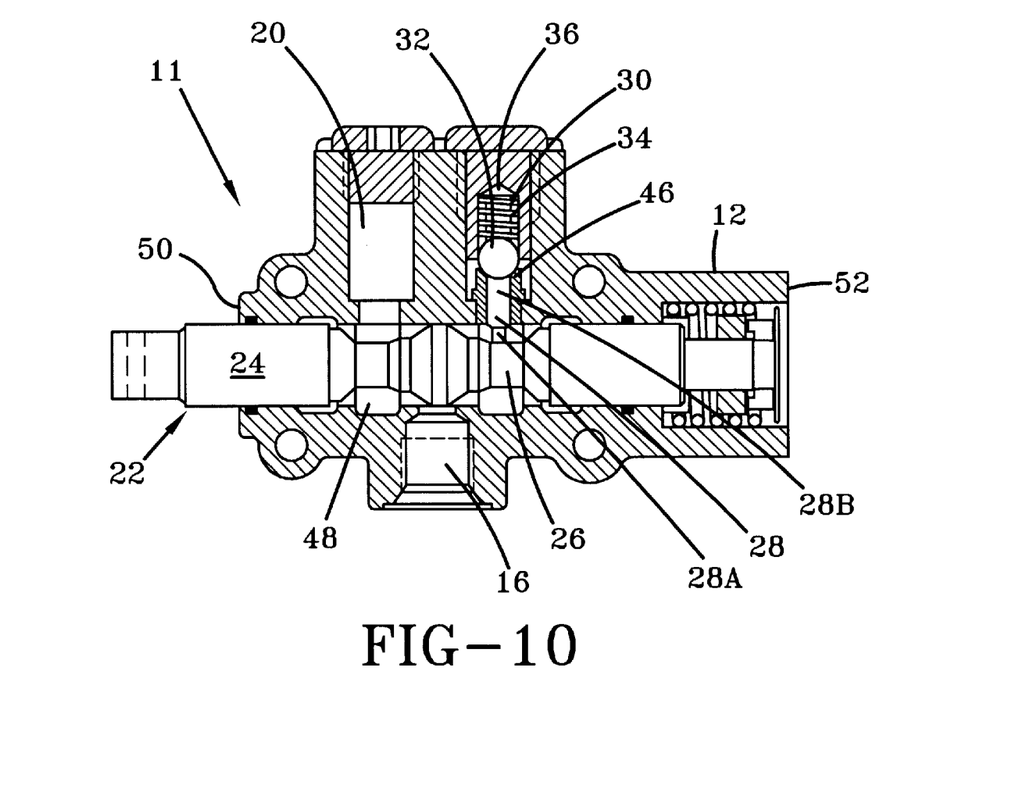
FIG. 10 is a cross-sectional view of the control valve.

As shown in FIGS. 2–10, and more specifically in FIGS. 5 and 10, the control valve 11 has first and second ends 50, 52 with a spool bore 48 defined therebetween. An inlet port 16 is defined in the valve body 12 and is in fluid communication with the bore 48 and the pump 38. The return port 18 is also defined in the valve body 12 and is in fluid communication with the bore 48 and the reservoir or tank 42. A first work port 36 is defined in the valve body 12 and is in fluid communication with the bore 48 and the cylinder 40. A second work port (or cylinder port) 20 is also disposed in the valve body 12 and is in fluid communication with the spool bore 48 and the tank 42. The second work port 20 is utilized in the lowering state. The second work port 20 is adapted to transfer working fluid from the cylinder 40 to the reservoir 42 in the lowering state. A spool 22 is at least partially snuggly received within the spool bore 48 of the valve body 12. The spool 22 is a moving cylinder within the valve 11 that directs fluid flow.

Figure 13:
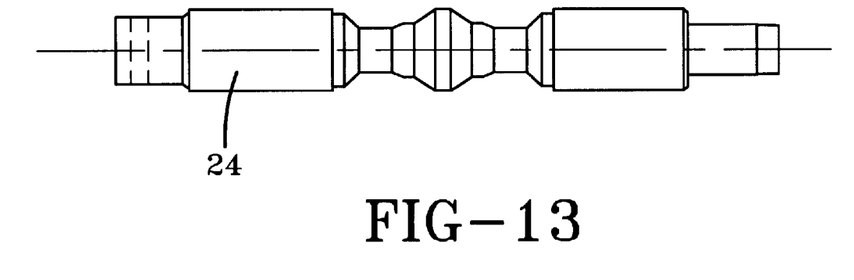
FIG. 13 is a cross sectional view of the spool of the control valve.

Viewing FIG. 13, the spool 22 comprises at least a first spool section 24 and a spool cam section 26. The first spool section 24 has a constant diameter and the spool cam section 26 has a variable diameter. The spool cam section 26 is adapted to selectively vary the discharge flow rate of the cylinder 40 during the lowering state. This is achieved by custom machining the spool 22 to a predetermined geometry.

Now turning to FIG. 10, the feedback control system 10 further comprises a check valve 30 disposed in the first work port 36 of the valve body 12. The check valve 30 comprises a spring 34 attached to the valve body 12, a ball 32 connected to the spring 34, and a seat 46 for the ball 32. The spring 34 is adapted to bias the ball 32 against the seat 46 in order to prevent back flow of the working fluid. Check valves are well known in the art and will not be further described herein. During the lifting state, the fluid flow enters the inlet port 16, passes through the spool bore 48, and enters the first work port 36. The fluid flow overcomes the bias of the spring 34 and unseats the ball 32. This causes fluid to pass through the first work port 36 and into the cylinder 40 to lift the hitch 44 of the tractor. The check valve 30 is adapted to prevent fluid from entering the cylinder 40 when the feedback control system 10 is in the neutral operating state. The check valve 30 is also adapted to be selectively opened by a spool cam pin 28 to selectively vary the discharge flow rate of the cylinder 40 during the lowering state.

The spool cam pin 28 is disposed in the valve body 12 and has first and second ends 28A, 28B. The first end 28A contacts the spool cam section 26. The spool cam pin 28 extends through the seat 46 and the second end 28B selectively contacts the ball 32 of the check valve 30 as the spool cam pin 28 moves along the spool cam section 26. This results in the ball 32 overcoming the bias of the spring 34 during the lowering state. The working fluid can then drain from the cylinder 44 through the first work port 36, then through the second work port (or cylinder port) 20 to the tank 42. The spool cam section 26 may take a variety of shapes, such as but not limited to a conical shape. The cross-section of the conical shape may be substantially planar or it may be curved.

Figure 12:
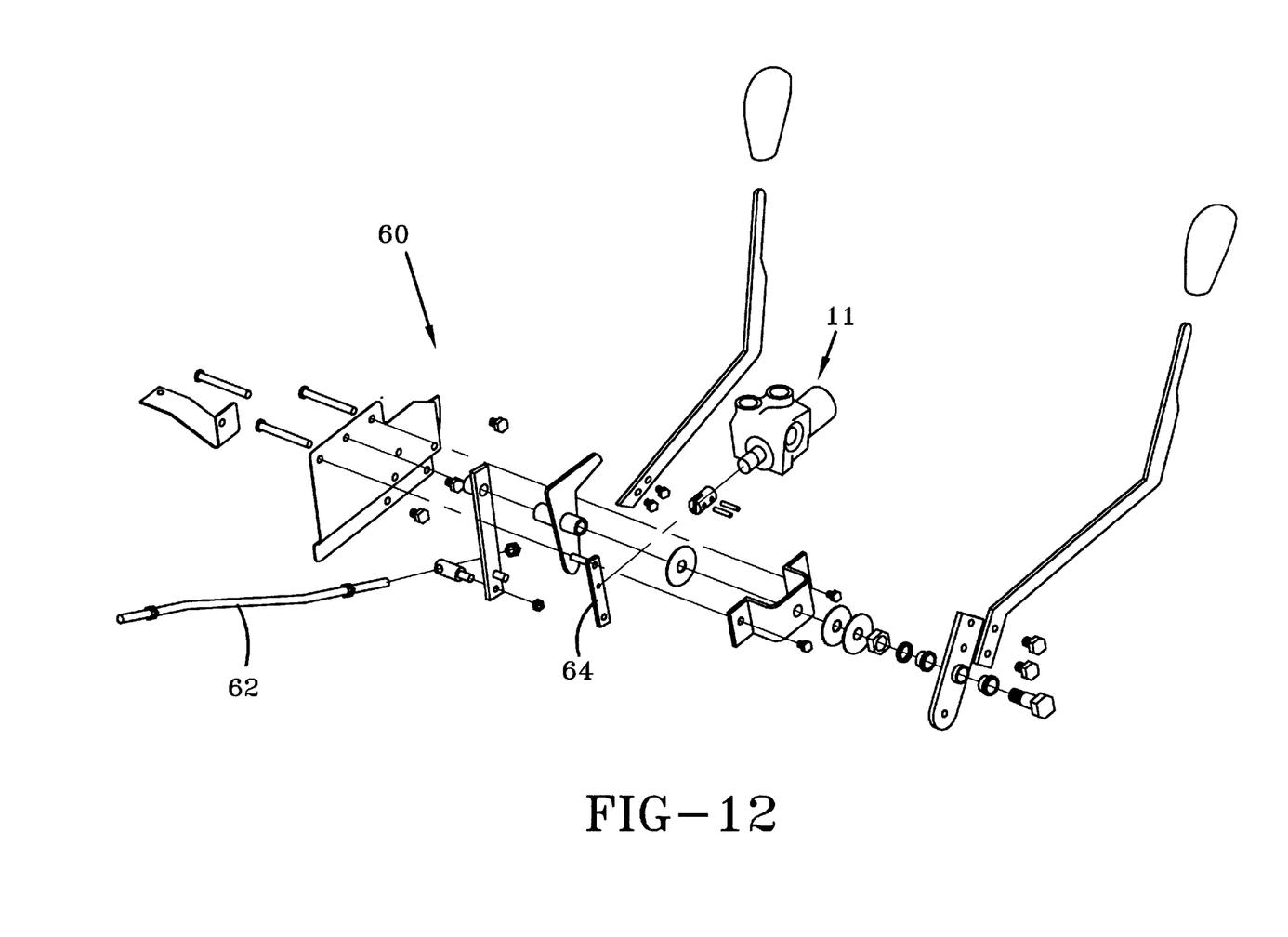
FIG. 12 is an exploded view showing the mechanical linkage controlling the feedback system.

The lift position control system 10 utilizes a common shaft pivoting feedback control 60, best seen in FIG. 12. The mechanical linkage of FIG. 12 is used to change the position of the spool 22 within the valve 11 to achieve the various operating states. One shaft 62 comprises three different pivot points on the feedback system. It is typical in the art for the pivoting feedback control system to utilize at least two shafts to achieve the various positions. In the present invention, one casting 64 acts as a link, which is the connection point to the hydraulic cylinder 40. It is also the connection point for the feedback control and then also for a midlift system (not shown) if mounted to it. Generally, art in the field teaches the cylinder being mounted on a separate arm positioned between two outer arms, which are then combined into the transmission housing. As shown in FIGS. 11 and 12, the cylinder 40 of the present invention is mounted inside the transmission. The middle linkage has been eliminated and has been combined into one large casting.

In order to use the present invention, the lifting state, the neutral state and the lowering state must be attained to properly position the hitch 44 of the tractor. The method comprises the steps of providing the control valve 11 having the elements described hereinabove. Also, the pump 38 is provided for pressurizing fluid in the tank 42 so that the fluid flows from the tank 42 to the inlet port 16. The tank 42 is provided for containing the working fluid, and the inlet port 16, return port 18 and second work port 20 are in fluid communication with the tank 42. The cylinder 40 is provided to position the hitch 44 at a pre-determined level or position. The cylinder 40 is adapted to be in fluid communication with the inlet port 16 and the first work port 36 in the lifting state and in fluid communication with the first work port 36 and the second work port 20 in the lowering state.

To attain the various states, the spool 22 is moved by a mechanical linkage to a first position. This results in fluid being pressurized by the pump 38 such that fluid flows from the tank 42, through the inlet port 16, and through the first work port 36 to the cylinder 40. This results in the hitch 44 being lifted. The spool 22 is then moved to a second position. The spool 22 provides circulation of the fluid from the inlet port 16 to the return port 18. At this second position, the check valve 30 is in its seat 46; therefore, fluid does not flow from the inlet port 16 to first work port 36. The hitch 44 is maintained in the lifted state, resulting in the neutral position. The spool 22 can then be positioned to a third position. In this state, fluid flows from the inlet port 16 and then to the tank 42 through the return port 18. The fluid from the cylinder 40 drains to the tank 42 through the first work port 36, it passes through the spool bore 48 and then through the second work port 20. This results in lowering the hitch 44.

During the lowering state, the spool cam pin 28 follows the diameter of the spool cam section 26, meaning it moves along the outer surface of the spool cam section 26. In other words, as the hitch 44 is lowering, the spool cam pin 28 rides along the outer surface of the spool cam section 26 to selectively adjust the check valve 30 to provide controlled fluid flow from the cylinder 40 to the tank 42 through the second work port 20.

To summarize the foregoing, a control valve 11 comprises one spool 22 rather than two. A working fluid, such as oil, is directed to the second work port (cylinder port) 20 instead of being plumbed to another cylinder. The working fluid is routed back to the tank 42 so that a second circuit is formed during the neutral operating state.

In the neutral operating state, the working fluid enters the valve body 12 through the inlet port 16, and circumvents the first work port 36. The working fluid flows directly to the return port 18 and back to the tank 42. Plumbing the control valve 11 backwards in this fashion forms two separate and independent circuits. Since the cylinder 42 does not see back-pressure from the inlet line, the bias of the spring 34 of the check valve 30 is not overcome, so the hitch does not automatically rise since the circuit has been divided.

In the lowering state, the check valve 30 is mechanically unseated, but rather than try to combine the two circuits together and make the working fluid from the cylinder 42 and the input port 16 flow into the same tank port, the working fluid entering the inlet port 16 flows to the return port 18, and the working fluid flowing from the cylinder 42 (and back through the first work port 36) flows into the cylinder port 20. The two circuits are completely separate lines, so the two do not see each other.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed.

What is claimed is:

1. A feedback control system having three operating states, said operating states including a lifting state, a neutral state, and a lowering state, said feedback control system comprising:

a cylinder;

a pump;

a tank for holding a working fluid; and a control valve, said control valve comprising:

a valve body having first and second ends with a bore defined therebetween;

an inlet port defined in said valve body, said inlet port communicating with said bore and said pump;

a return port defined in said valve body, said return port communicating with said bore and said reservoir;

a first work port defined in said valve body and communicating with said cylinder;

a cylinder port, said cylinder port being utilized in said lowering state, said cylinder port adapted to transfer working fluid from said cylinder to said reservoir;

a spool at least partially snuggly received within said spool bore of said valve body;

wherein said spool has at least a first spool section and a cam spool section, said first spool section having a constant diameter, said spool cam section having a variable diameter adapted to selectively vary the discharge flow rate of said cylinder;

wherein said spool cam section is conical in shape; and, wherein said spool cam section has a curved cross section.

2. The feedback control system of claim 1, further comprising a check valve disposed in said first work port, said first check valve adapted to prevent fluid from entering said cylinder when said feedback control system is in the neutral operating state.

3. The feedback control system of claim 2, wherein said check valve is adapted to be selectively opened by a spool cam pin to selectively vary the discharge flow rate of said cylinder, said spool cam pin being disposed in said valve body and contacting said spool cam section.

4. The feedback control system of claim 3, wherein said check valve further comprises:
   a spring attached to said valve body;
   a ball connected to said spring; and
   a seat for said ball, said spring adapted to bias said ball against said seat, said spool cam pin extending through said seat and selectively contacting said ball as said spool cam pin moves along said spool cam section, such that said ball overcomes the bias of said spring.

5. The feedback control system of claim 1, wherein said spool cam section has an angled cross section that is substantially planar.

6. A feedback control system having a pump, a cylinder, a reservoir and a control valve for lifting and lowering a hitch of a tractor, said control valve, comprising:
   a valve body having a spool bore;
   an inlet port disposed in said valve body and communicating with said spool bore and said pump;
   a return port disposed in said valve body and communicating with said spool bore and said reservoir;
   a first work port disposed in said valve body communicating with said cylinder;
   a cylinder port disposed adapted to carry working fluid from said cylinder to said reservoir, said cylinder port carrying working fluid to said reservoir in an independent circuit from said return port;
   a check valve disposed in said first work port, said first check valve adapted to achieve said neutral state and being selectively adjustable to achieve said lowering state; and,
   one spool, said spool being received within said bore of said valve body;
   said spool having a spool cam section adapted to vary the discharge flow rate of said cylinder; and;
   said spool cam section having a curved cross section.

7. The feedback control system of claim 6, wherein said spool has at least a first spool section and a cam spool section, said first spool section having a constant diameter, said spool cam section having a variable diameter, said first spool section adapted to be utilized with said first check valve to achieve said neutral state, said cam spool section adapted to be utilized with said first check valve to achieve said lowering state.

8. The feedback control system of claim 7, wherein said cam spool section has an outer surface, said valve further comprising a spool cam pin that is selectively movable about said outer surface of said cam spool section.

9. The feedback control system of claim 6, wherein said cylinder port and said reservoir form an independent circuit from said return port and said reservoir.

10. A method of attaining a lifting state, a neutral state, and a lowering state for a hitch of a tractor, comprising the steps of:
   providing a valve, said valve comprising a valve body with first and second ends and a bore disposed between said first and second ends, said valve body further comprising an inlet port, a return port, a first work port, and a second work port, said valve further comprising one spool that is at least partially snuggly received in said bore, said spool comprising a first spool section of constant diameter and a spool cam section of varying diameter adapted to selectively vary the discharge flow rate of said cylinder, wherein said spool cam section is conical in shape and has a curved cross section, said valve further comprising a check valve disposed in said first work port, said check valve adapted to maintain said neutral state and to be selectively adjustable to achieve said lowering state;
   providing a pump for pressurizing fluid from said tank to said inlet port;
   providing a tank for fluid, said inlet port, return port and second work port being in fluid communication with said tank;
   providing a cylinder to position said hitch at a predetermined level, said cylinder adapted to be in fluid communication with said inlet port and said first work port in said lifting state and in fluid communication with said first work port and said second work port in said lowering state;
   positioning said spool to a first position;
   pressurizing fluid with said pump such that said fluid flows from said tank, through said inlet port and said first work port to said cylinder;
   lifting said hitch;
   positioning said spool in a second position, said spool providing fluid flow from said inlet port to said return port;
   maintaining said hitch in said lifted state;
   positioning said spool to a third position;
   draining fluid from said cylinder to said tank through said second work port;
   lowering said hitch.

11. The method of claim 10, wherein said valve further comprises a spool cam pin to follow said diameter of said spool cam section.

12. The method of claim 11, further comprising the step of moving said spool cam pin along an outer surface of said spool cam section as said spool is moved into said third position.

13. The method of claim 12, wherein draining fluid from said cylinder to said tank through said cylinder port comprises the step of selectively adjusting said check valve with said spool cam pin.

* * * * *